US008933877B2

(12) United States Patent
Alameh (10) Patent No.: US 8,933,877 B2
(45) Date of Patent: Jan. 13, 2015

(54) METHOD FOR PREVENTION OF FALSE GESTURE TRIGGER INPUTS ON A MOBILE COMMUNICATION DEVICE

(75) Inventor: Rachid M. Alameh, Crystal Lake, IL (US)

(73) Assignee: Motorola Mobility LLC, Libertyville, IL (US)

( * ) Notice: Subject to any disclaimer, the term of this patent is extended or adjusted under 35 U.S.C. 154(b) by 301 days.

(21) Appl. No.: 13/428,137

(22) Filed: Mar. 23, 2012

(65) Prior Publication Data

US 2013/0249785 A1 Sep. 26, 2013

(51) Int. Cl.
*G09G 5/00* (2006.01)
(52) U.S. Cl.
USPC .......................................... 345/156; 345/169
(58) Field of Classification Search
CPC ....... G06F 3/017; G06F 3/014; G06F 3/0304; G06F 17/00; G06F 1/163; G06F 3/005; G06F 3/011; G06F 3/044
USPC ............. 345/156, 169, 1.1, 1.2, 1.3, 173, 175
See application file for complete search history.

(56) References Cited

U.S. PATENT DOCUMENTS

| 2002/0024500 | A1 | 2/2002 | Howard |
| 2005/0052412 | A1 | 3/2005 | McRae et al. |
| 2006/0242607 | A1 | 10/2006 | Hudson |
| 2009/0215393 | A1* | 8/2009 | Smyers ........................ 455/41.2 |
| 2009/0239591 | A1 | 9/2009 | Alameh |
| 2010/0156676 | A1 | 6/2010 | Mooring |
| 2011/0022196 | A1 | 1/2011 | Linsky |
| 2011/0148752 | A1* | 6/2011 | Alameh et al. ................ 345/156 |
| 2011/0199292 | A1 | 8/2011 | Killbride |
| 2011/0293182 | A1* | 12/2011 | Krieter ........................ 382/181 |
| 2011/0312349 | A1* | 12/2011 | Forutanpour et al. ......... 455/466 |

FOREIGN PATENT DOCUMENTS

| EP | 0837418 A2 | 4/1998 |
| WO | 2011034881 A1 | 3/2011 |

OTHER PUBLICATIONS

Kim, The Gesture Watch: A Wireless Contact-free Gesture based Wrist Interface, http://smartech.gatech.edu/xmlui/bitstream/handle/1853/27812/gw_iswc07.pdf?sequence=1, Nov. 30, 2012, all pages.
Patent Cooperation Treaty, "PCT Search Report and Written Opinion of the International Searching Authority" for International Application No. PCT/US2013/026983 dated Feb. 21, 2013, 12 pages.
International Preliminary Report on Patentability from International Application No. PCT/US2013/026983, mailed Oct. 2, 2014 9 pp.

* cited by examiner

*Primary Examiner* — Duc Dinh
(74) *Attorney, Agent, or Firm* — Shumaker & Seiffert, P.A.

(57) ABSTRACT

A method for prevention of false gesture trigger inputs on a mobile communication device is disclosed herein. The method includes providing a relative positioning sensor output to a controller for enabling/disabling or adaptively adjusting detection of gesture inputs on the mobile communication device based on an angular position or motion of the mobile communication device relative to a directional trigger beam or alternatively relative to environmental conditions impacting the mobile communication device.

20 Claims, 13 Drawing Sheets

METHOD FOR PREVENTION OF FALSE GESTURE TRIGGER INPUTS ON A MOBILE COMMUNICATION DEVICE

FIELD OF THE DISCLOSURE

The present disclosure relates generally to receiving input information on a mobile communication device and more particularly to monitoring activity of a user and adapting the reception of input signals to a mobile communication device to avoid false trigger inputs to the mobile communication device.

BACKGROUND

Wearable communication devices that monitor heart rate and other biometric functions are increasingly being used by a more active user. The communication devices are usually wrist worn mobile communication devices, but need not be. For example, a pendant or a chest strap might be worn as well during exercise. Input information can be entered manually or picked up from surroundings via several sensors that may be incorporated into the mobile communication device. For example, three dimensional infrared (IR) systems have been developed for off device gesturing.

However, in a wearable communication device, IR sensors can false trigger by reflecting off nearby objects, for example. This false trigger can occur, for example, when a user of the wearable communication device moves their hand that the wearable communication device is strapped to. The hand movement may occur while the user is walking, eating, drinking from a cup, driving, or unlocking doors, for example. Accordingly, there is a need for a method for prevention of false gesture trigger inputs on a mobile communication device.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention. Where possible, the same reference number has been used in multiple figures for consistency and clarity.

The apparatus and method components have been represented where appropriate by conventional symbols in the drawings, showing only those specific details that are pertinent to understanding one or more embodiments so as not to obscure the disclosure with details that will be readily apparent to those of ordinary skill in the art having the benefit of the description herein.

DETAILED DESCRIPTION

A method for prevention of false gesture trigger inputs on a mobile communication device is disclosed herein. The method includes providing a relative positioning sensor output to a controller for enabling/disabling or adaptively adjusting detection of gesture inputs on the mobile communication device based on an angular position or motion of the mobile communication device relative to a directional trigger beam.

Figure 1:
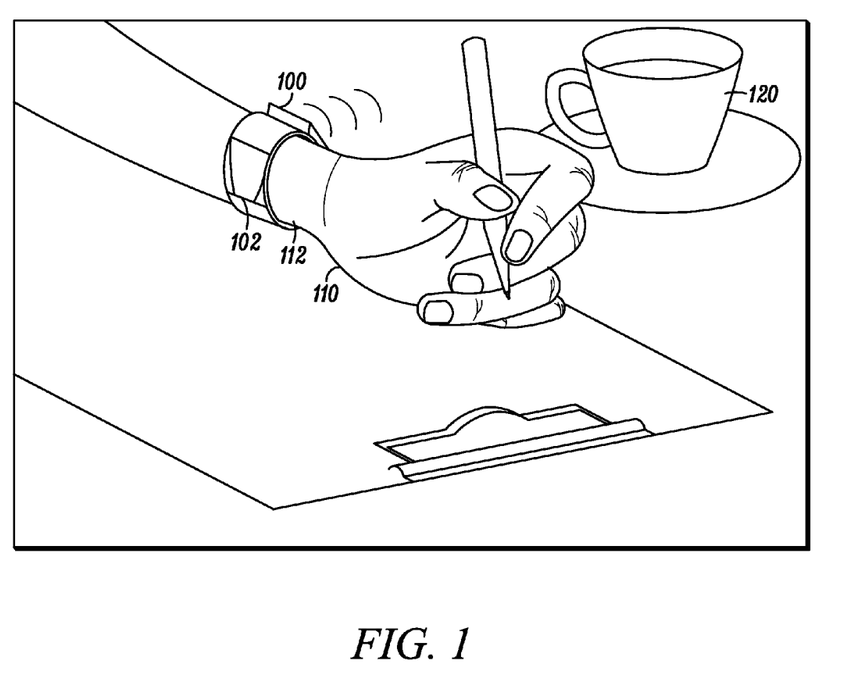
FIG. 1 illustrates by way of example one usage of the mobile communication device in one orientation.

FIG. 1 is an example illustration for showing that external and nearby or proximate objects could false trigger an infrared (IR) transceiver signal emanating from the mobile communication device or mobile computing device (MCD) 100 when the MCD 100 is pointing away from the user's field of view (i.e., the user is unable to see directly the display of the MCD). The IR transceiver is disabled by one or more sensors (e.g., an accelerometer measuring tilt and movement of MCD 100). In FIG. 1, MCD 100 includes a wristband 102 for attaching to a wrist 112 of a user 110. The user's field of view is away from the display of MCD 100 as he writes. In addition, the coffee cup 120 may cause a false trigger because of its proximity to the MCD 100. In this respect, the IR transceiver internal to MCD 100 will have to be disabled upon sensing the closeness of the cup 120 to the MCD 100 or as a result of a tilt orientation, as detected by an internal accelerometer, away from the field of view of the user.

Figure 2:
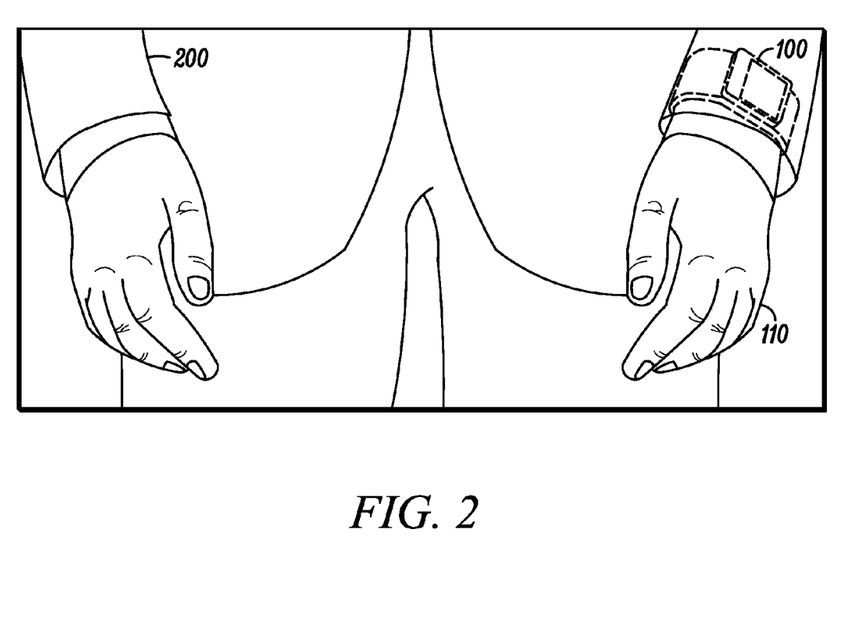
FIG. 2 illustrates by way of example the mobile communication device covered by clothing.

FIG. 2 is an example illustration for showing that MCD 100 can be covered either by a cuff of a dress shirt or of a suit jacket 200. Therefore, the presence of clothing that may cover MCD 100, as it is worn by user 110, is detected by various means. For example, a plurality of sensors can capture data that may indicate the presence of clothing, including sensor types such as: capacitive, accelerometer, visible light, muffled acoustics, and resistive, for example. An accelerometer may capture static movement and accelerated movement. A gyroscope may capture linear or angular movement. Additionally, MCD 100 may be assessed for context awareness data associated with MCD 100 and the user 110 of MCD 100. Relevant context awareness data can include, for example, time of day, location, environment information, wireless network information. These sensors and context awareness data can be used in conjunction to disable the IR transceiver when appropriate based on a predetermined set of conditions or on dynamically changing conditions that may be adapting to what the user 110 is presently experiencing.

Figure 3:
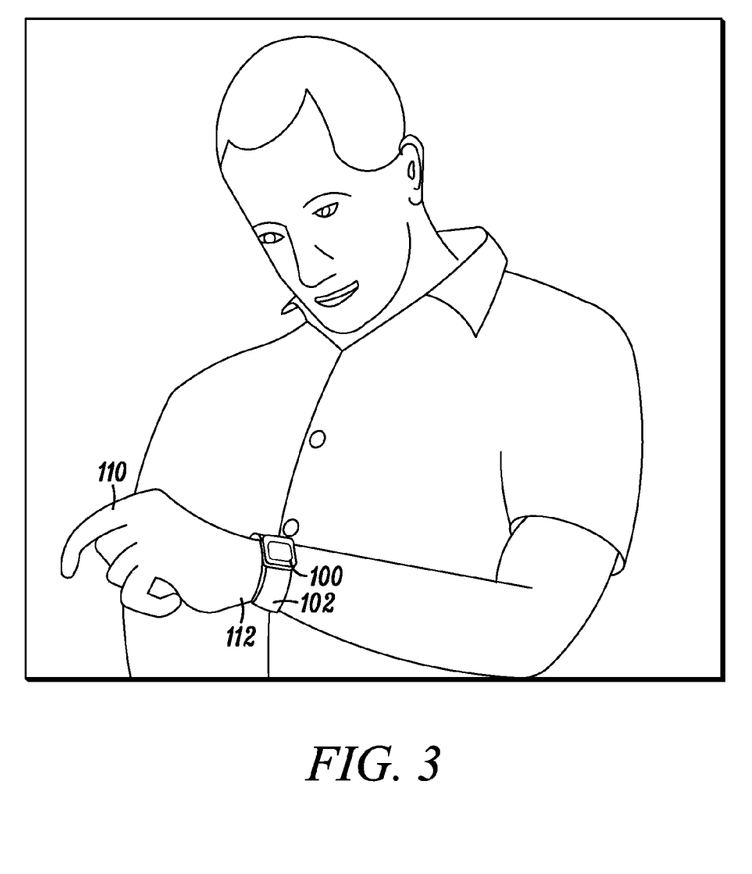
FIG. 3 illustrates by way of example one usage of the mobile communication device in one orientation with respect to a user's field of view.

FIG. 3 is an example illustration for showing when the internal IR transceiver of MCD 100 can be enabled based on predetermined conditions associated with MCD 100, such as the user 110 looking at the MCD 100 and MCD 100 is relatively stationary. Other conditions can include the user 110 gesturing over MCD 100 and the absence of nearby objects that could send false input signals to MCD 100. Likewise, an internal accelerometer or gyroscope for MCD 100 may provide angular information to a controller to indicate whether MCD 100 is at an optimum angle relative to user 110.

Figure 4:
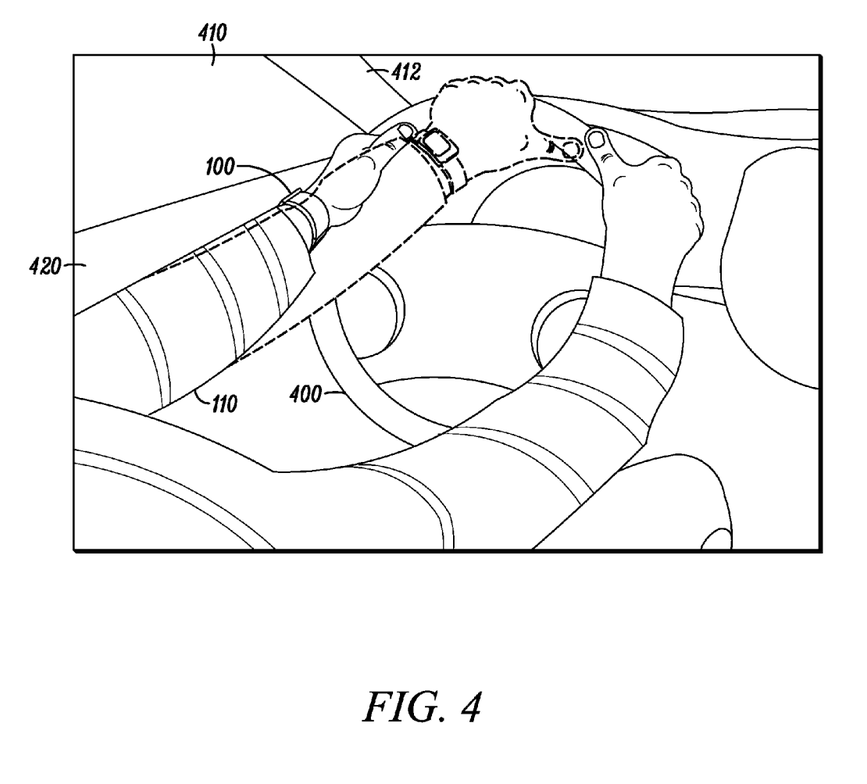
FIG. 4 illustrates by way of example one usage of the mobile communication device in multiple orientations during driving.

FIG. 4 is an example illustration showing how context awareness detection can be determined, wherein the context is the act of driving. The user 110 is illustrated controlling steering wheel 400 while wearing MCD 100. Two positions for user's hands are shown to control steering wheel 400. In position A, the MCD 100 is proximate or near the driver's window. As such, the IR transceiver in MCD 100 can receive unwanted reflected signals from the window 410, door 420, and window frame 412. In position B, the MCD 100 is less likely to receive unwanted or false trigger inputs. Context detection of nearby objects such as the window 410, window frame 412, and door 420 can be determined by sensing whether the hand wearing MCD 100 is in contact with steering wheel 400, detecting internal accelerometer data profile or detecting that user 110 is the driver by other means, such as a mounted camera or user identification input to a system coordinated with the vehicle. The IR range of the transceiver can be adaptively adjusted based on the angle of steering wheel 400 with respect to MCD 100. IR range is preferably reduced to avoid "falsing" (i.e., false gesture input triggering) when the hand including MCD 100 is near the driver's window 410 and the MCD 100 faces the driver's window 410. The IR range is increased when the MCD 100 faces away from the driver's window 410; otherwise the IR transceiver has a normal range.

Figure 5:
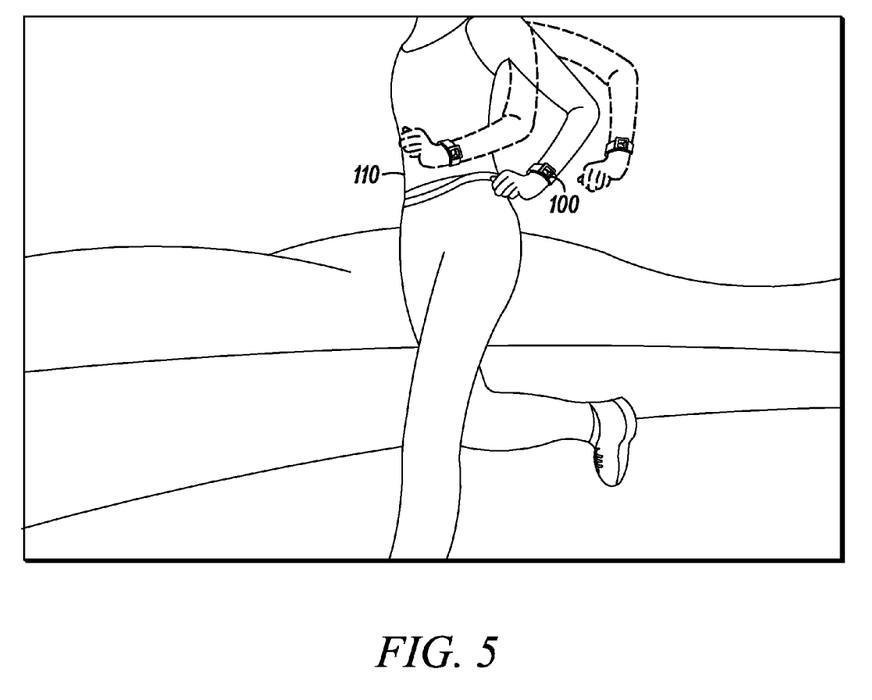
FIG. 5 illustrates by way of example one usage of the mobile communication device during a vigorous exercise routine.

MCD 100 illustrated in FIG. 5 is shown to be subjected to rapid movement during a vigorous running exercise. The IR range of the transceiver can be adaptively adjusted to prevent improper or unwanted activation of the MCD 100 as the MCD 100 undergoes a change in its proximate position relative to one or more body parts of user 110 during the running exercise.

Figure 6A:
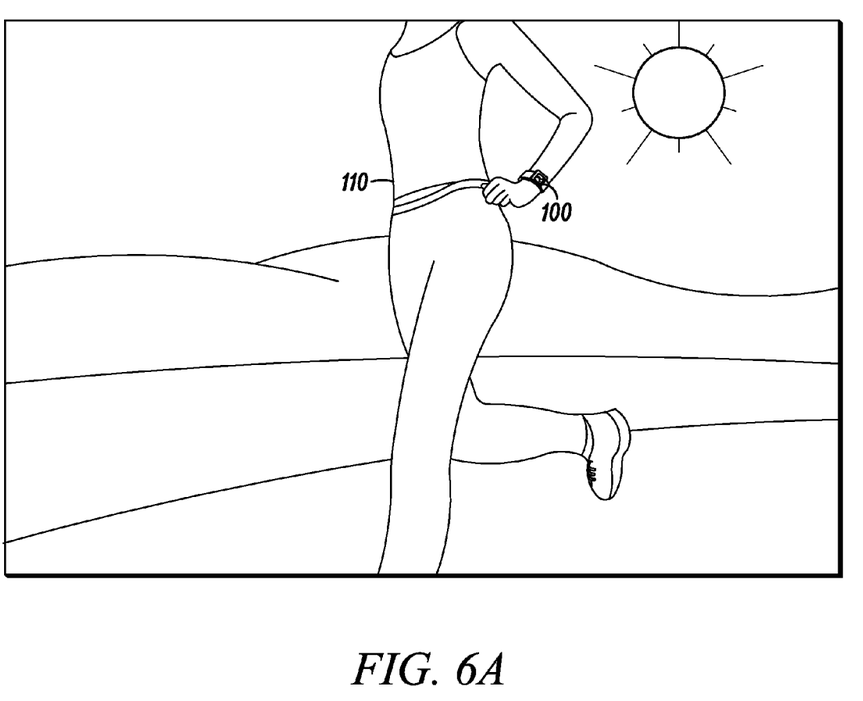
FIG. 6A illustrates by way of example one usage of the mobile communication device in one environment.

FIG. 6A is an example illustration for showing that background or environmental lighting or conditions can be assessed for interference with the range and power of the internal IR transceiver for the MCD 100. For example, if the user 110 is in bright sunlight while wearing MCD 100, the IR power can be increased to overcome any interference.

Figure 6B:
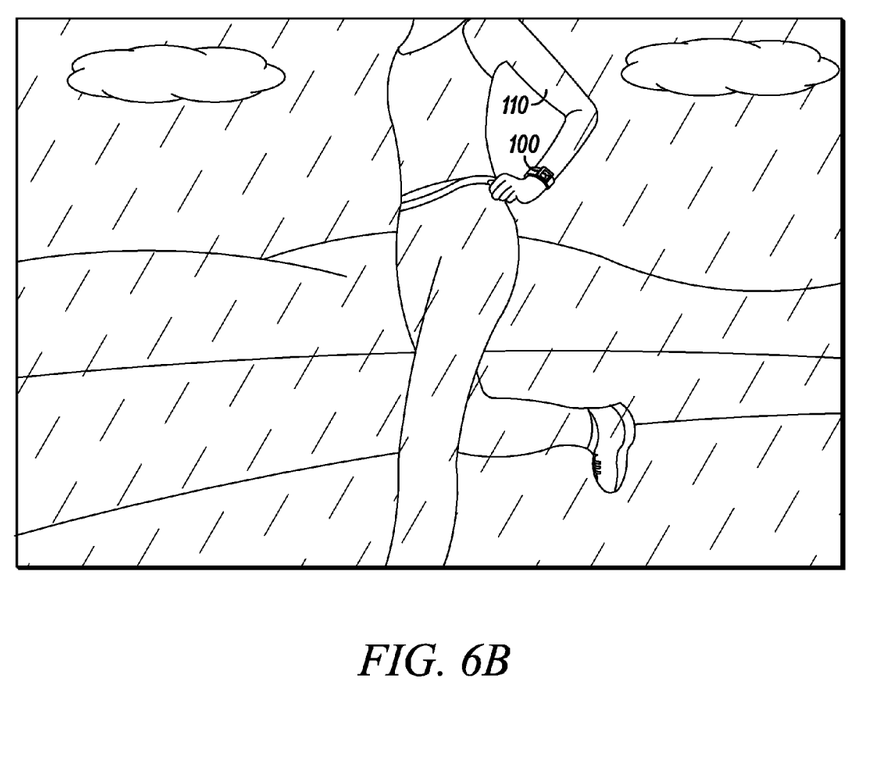
FIG. 6B illustrates by way of example one usage of the mobile communication device in a different environment from FIG. 6A.

FIG. 6B is an example illustration for showing that background or environmental lighting or conditions can be assessed for interference with the range and power of the internal IR transceiver for the MCD 100. For example, if the user 110 is in a cloudy or darkened environment while wearing MCD 100, the IR power can be reduced, because IR interference is likely low. Accordingly, at least one operational function such as power selection or communication signal strength can be adaptively adjusted or changed.

Figure 7:
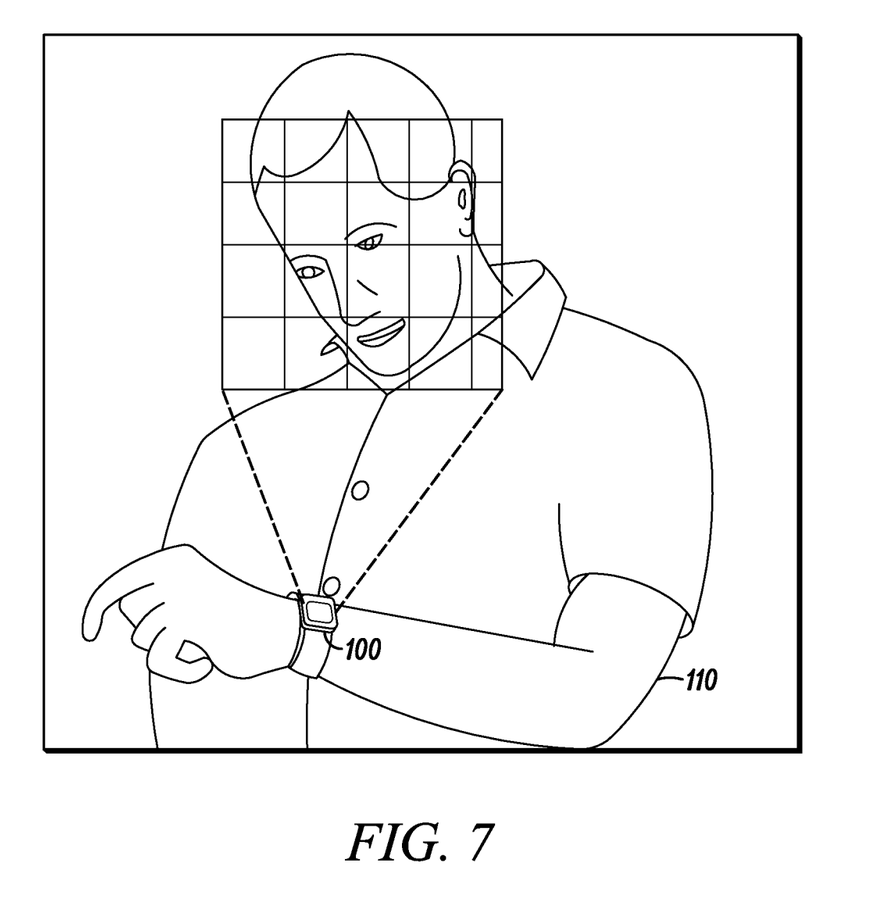
FIG. 7 illustrates by way of example one usage of the mobile communication device employed with imaging sensors.

FIG. 7 is an example illustration for showing that an internal camera or one or more internal imaging sensors can be included to detect facial body parts and the user's field of view to determine when the user 110 is looking directly or perpendicularly at the display on MCD 100, irrespective of any associated tilt angle of the MCD 100 to the user 110. Such detection by an internal camera can further signal that the IR transceiver should be enabled. The internal camera can also be used to detect the presence of clothing, nearby objects and other objects that can cause interference with IR transceiver of MCD 100. The camera can include for example, complementary metal oxide sensors (CMOS), charge-coupled devices, (CCD), and also various lenses, such as fish eye lenses. In one embodiment, the user may define his field of view and input that user definable field of view into MCD 100. The field of view of the user 110 can include a direct field of view and a peripheral field of view of the user 110 with respect to the MCD 100; therefore, the MCD 100 is located relative to a field of view of a user 110 of the MCD 100.

Figure 8:
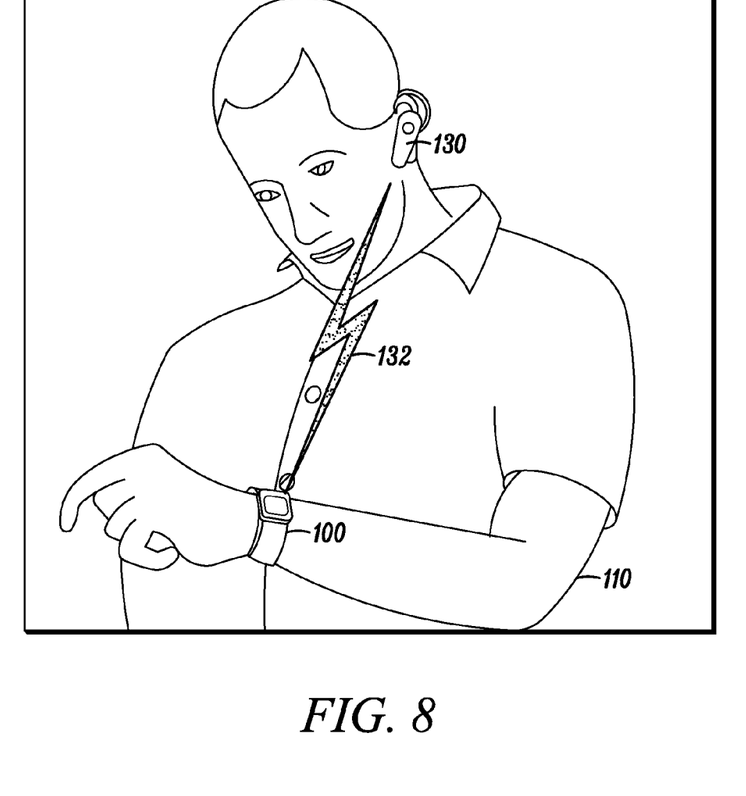
FIG. 8 illustrates by way of example one usage of the mobile communication device communicatively coupled to a wireless headset.

FIG. 8 is an example illustration for showing that MCD 100 can receive a beacon 132 from an ear mounted headset 130 when the user is looking directly at MCD 100. The beacon 132, emanating from the headset 130, may be one of the following for example: a short distance beacon, a line of sight beacon, an IR beacon, or an ultrasonic beacon. When the beacon 132 is received by MCD 100 the IR transceiver can be fully enabled to function with a high sampling rate, high communication signal strength, high sensitivity, and predominantly full duty cycle (i.e., "on" all the time). Without directly receiving the headset beacon 132, MCD 100 is preferably in a low duty cycle mode, wherein the IR transceiver is capable of receiving occasional signal beacons.

Figure 9:
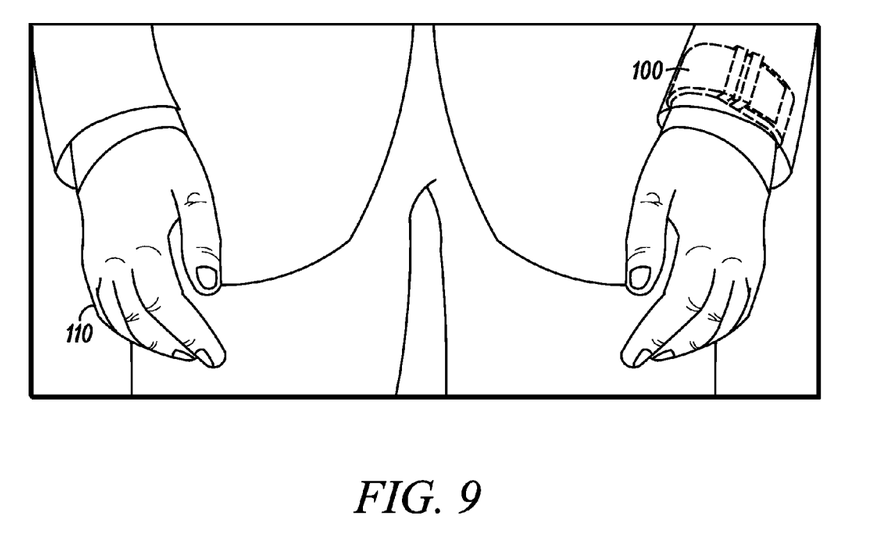
FIG. 9 illustrates by way of example one usage of the mobile communication device in a different orientation than shown in FIG. 2.

FIG. 9 is an example illustration for showing that the MCD 100 can be worn by user 110 on the inside of the wrist (i.e., facing the body). Any of the aforementioned means can be employed to detect the pointing direction of the MCD 100 relative to the wrist. Upon detection of this orientation, the IR transceiver of MCD 100 can be disabled. In one embodiment, the user may define his orientation and input that user definable orientation into MCD 100.

The sensors, described above, for MCD 100 can be incorporated within the head of MCD 100, the wrist band of MCD 100, or a combination thereof. The sensors can also be worn, by the user 110, outside of the structure of MCD 100, such as the ear mounted headset shown in FIG. 8. Notably, the IR transceiver and the ultrasonic sensor may emanate a directional trigger beam from MCD 100. The directional trigger beam can point in a perpendicular direction relative to a display on the MCD 100 or alternatively point in a non-perpendicular direction relative to the display on the MCD 100.

Figure 10:
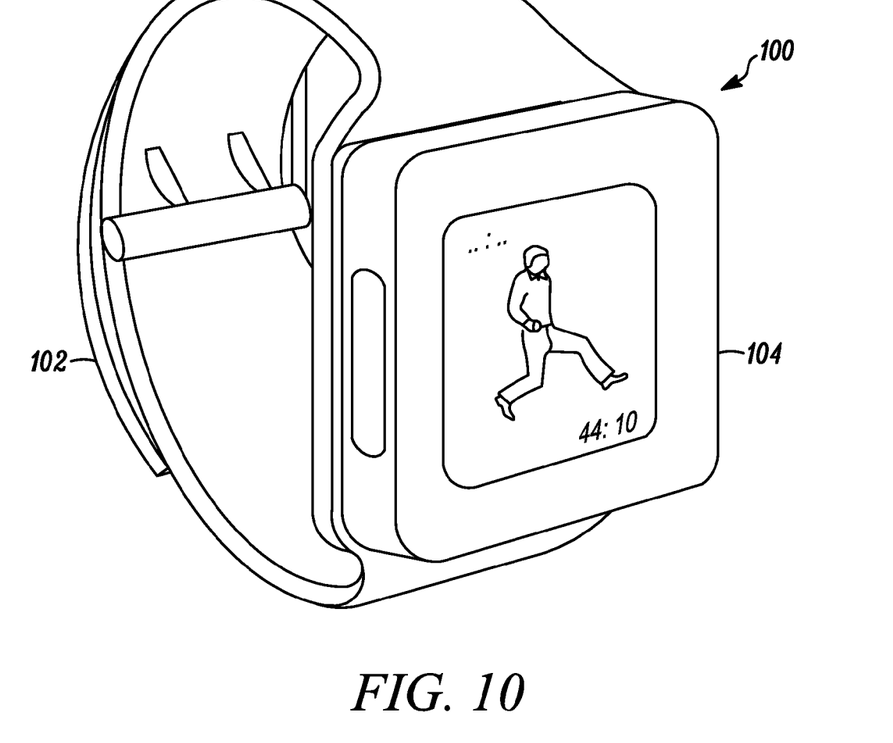
FIG. 10 illustrates, by way of example, the mobile communication device.

These sensors are supplemented by context data downloaded wirelessly. The context data can include information on global positioning system (GPS), time of day, weather, speed, and elevation, for example. MCD 100 may also receive radio frequencies (RF) and electromagnetic signals. FIG. 10 is an example illustration for showing that MCD 100 can include a wristband 102 and a display 104.

Figure 11:
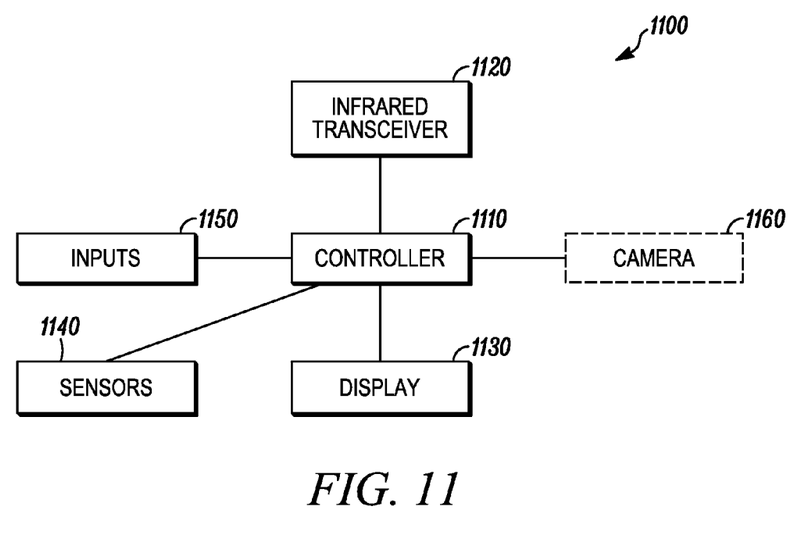
FIG. 11 illustrates, by way of example, a system for the mobile communication device.

FIG. 11 is an example illustration for showing relevant system components for one or more described embodiments herein. System 1100 can reside internal to or may be electrically and communicatively coupled to MCD 100 and can include a controller 1110, an IR transceiver 1120, a display 1130, one or more sensors 1140, one or more inputs 1150, and optional camera 1160.

Figure 12:
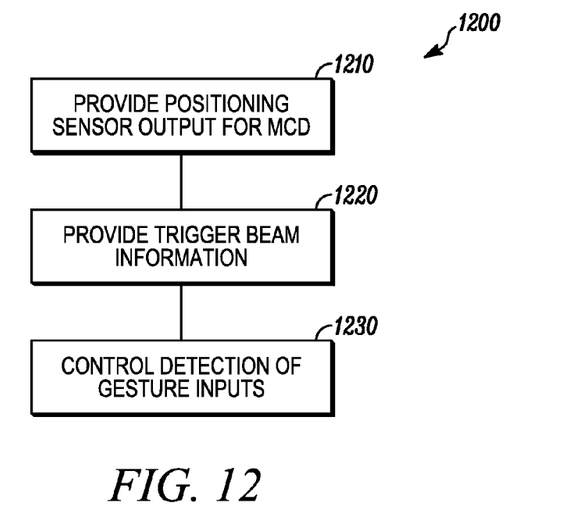
FIG. 12 illustrates, by way of example, one flowchart.

One embodiment for preventing false gesture trigger inputs on MCD 100 is shown by an example flowchart 1200 in FIG. 12. Step 1210 provides a relative positioning sensor output to controller 1110. Step 1220 provides directional trigger beam information to the controller 1110. Step 1230 directs the controller to either enable/disable or adaptively adjust detection of gesture inputs on MCD 100 based on an angular position or motion of the MCD 100 relative to the directional trigger beam.

Figure 13:
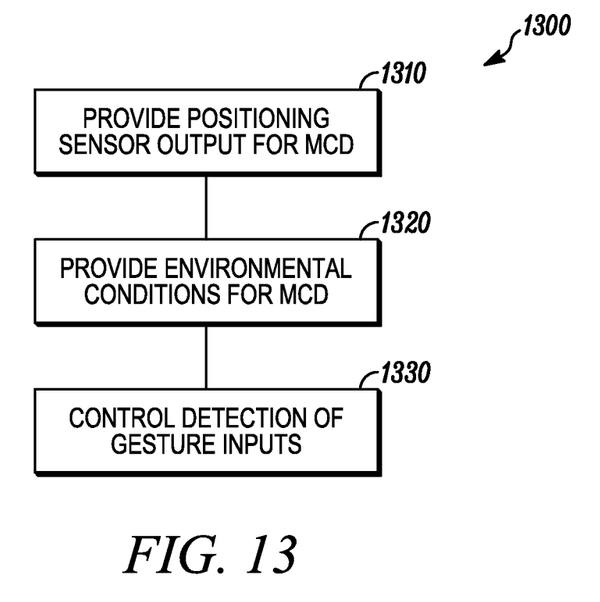
FIG. 13 illustrates, by way of example, another flowchart.

Another embodiment for preventing false gesture trigger inputs on MCD 100 is shown by an example flowchart 1300 in FIG. 13. Step 1310 provides a relative positioning sensor output to controller 1110. Step 1320 provides environmental conditions impacting MCD 100 to controller 1110. Step 1330 directs the controller to either enable/disable or adaptively adjust detection of gesture inputs on MCD 100 based on an angular position or motion of the MCD 100 impacting MCD 100.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Likewise, computer-readable storage medium can comprise a non-transitory machine readable storage device, having stored thereon a computer program that include a plurality of code sections for performing operations, steps or a set of instructions.

Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method comprising:
receiving, by one or more processors of a mobile computing device, information from one or more sensors of the mobile computing device;
determining, by the one or more processors and based on at least some of the information received from the one or more sensors, a direction of a display of the mobile computing device relative to a field of view of a user of the mobile computing device; and
adjusting, by the one or more processors and based on the direction of the display of the mobile computing device relative to the field of view of the user of the mobile computing device, an infrared (IR) range of an IR transceiver configured to detect gesture inputs.

2. The method of claim 1, further comprising adjusting, by the one or more processors and based on environmental lighting conditions, an IR power of the IR transceiver.

3. The method of claim 1, wherein:
the one or more sensors include a camera; and
the method further comprises:

using, by the one or more processors, the camera to determine that the user is looking directly at the display of the mobile computing device; and determining, by the one or more processors and based on whether the user is looking directly at the display of the mobile computing device, whether to enable the IR transceiver.

4. The method of claim 1, further comprising increasing, by the one or more processors, a sampling rate, a communication signal strength, and a sensitivity of the IR transceiver in response to the mobile computing device receiving a beacon from an ear-mounted headset.

5. The method of claim 1, further comprising disabling, by the one or more processors, the IR transceiver in response to determining that the mobile computing device is worn on an inside of a wrist of the user.

6. The method of claim 1, further comprising adjusting, by the one or more processors and based on an angle of a steering wheel with respect to the mobile computing device, the IR range of the IR transceiver.

7. The method of claim 1, further comprising:

determining, by the one or more processors and based on the information received from the one or more sensors, that the user of the mobile computing device is running; and in response to determining that the user is running, adjusting, by the one or more processors, the IR range of the IR transceiver.

8. The method of claim 1, wherein the gesture inputs are off-device gestures.

9. A mobile computing device comprising:

an infrared (IR) transceiver configured to detect gesture inputs;

one or more sensors;

a display; and one or more processors configured to:

receive information from the one or more sensors;

determine, based on at least some of the information received from the one or more sensors, a direction of the display of the mobile computing device relative to a field of view of a user of the mobile computing device; and adjust, based on the direction of the display of the mobile computing device relative to the field of view of the user of the mobile computing device, an IR range of the IR transceiver.

10. The mobile computing device of claim 9, wherein the one or more processors are further configured to adjust, based on environmental lighting conditions, an IR power of the IR transceiver.

11. The mobile computing device of claim 9, wherein:

the one or more sensors include a camera; and the one or more processors are configured to:

use the camera to determine that the user is looking directly at the display of the mobile computing device; and determine, based on whether the user is looking directly at the display of the mobile computing device, whether to enable the IR transceiver.

12. The mobile computing device of claim 9, wherein the one or more processors are configured to increase a sampling rate, a communication signal strength, and a sensitivity of the IR transceiver in response to the mobile computing device receiving a beacon from an ear-mounted headset.

13. The mobile computing device of claim 9, wherein the one or more processors are configured to disable the IR transceiver in response to determining that the mobile computing device is worn on an inside of a wrist of the user.

14. The mobile computing device of claim 9, wherein the one or more processors are further configured to adjust, based on an angle of a steering wheel with respect to the mobile computing device, the IR range of the IR transceiver.

15. The mobile computing device of claim 9, wherein the one or more processors are further configured to:

determine, based on the information received from the one or more sensors, that the user of the mobile computing device is running; and in response to determining that the user is running, adjust the IR range of the IR transceiver.

16. The method of claim 9, wherein the gesture inputs are off-device gestures.

17. A non-transitory computer-readable storage medium storing computer-readable code for programming one or more processors of a mobile computing device to:

receive information from one or more sensors of the mobile computing device;

determine, based on at least some of the information received from the one or more sensors, a direction of the display of the mobile computing device relative to a field of view of a user of the mobile computing device; and adjust, based on the direction of the display of the mobile computing device relative to the field of view of the user of the mobile computing device, an infrared (IR) range of an IR transceiver configured to detect gesture inputs.

18. The non-transitory computer-readable storage medium of claim 17, wherein the instructions further program the one or more processors to adjust, based on environmental lighting conditions, an IR power of the IR transceiver.

19. The non-transitory computer-readable storage medium of claim 17, wherein:

the one or more sensors include a camera; and the instructions further program the one or more processors to:

use the camera to determine that the user is looking directly at the display of the mobile computing device; and determine, based on whether the user is looking directly at the display of the mobile computing device, whether to enable the IR transceiver.

20. The non-transitory computer-readable storage medium of claim 17, wherein the instructions further program the one or more processors to increase a sampling rate, a communication signal strength, and a sensitivity of the IR transceiver in response to the mobile computing device receiving a beacon from an ear-mounted headset.

* * * * *